United States Patent
Hasegawa et al.

(10) Patent No.: US 10,094,587 B2
(45) Date of Patent: Oct. 9, 2018

(54) HEAT-EXCHANGE VENTILATION DEVICE

(71) Applicant: Mitsubishi Electric Corporation, Chiyoda-ku, Tokyo (JP)

(72) Inventors: Kohei Hasegawa, Tokyo (JP); Kohei Matsumoto, Tokyo (JP); Masashi Ashino, Tokyo (JP); Fumio Saito, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 24 days.

(21) Appl. No.: 15/514,936

(22) PCT Filed: Oct. 10, 2014

(86) PCT No.: PCT/JP2014/077261
§ 371 (c)(1),
(2) Date: Mar. 28, 2017

(87) PCT Pub. No.: WO2016/056141
PCT Pub. Date: Apr. 14, 2016

(65) Prior Publication Data
US 2017/0219237 A1    Aug. 3, 2017

(51) Int. Cl.
*F24F 12/00* (2006.01)
*F24F 11/30* (2018.01)
(Continued)

(52) U.S. Cl.
CPC .......... *F24F 11/30* (2018.01); *F24F 11/0012* (2013.01); *F24F 11/0079* (2013.01);
(Continued)

(58) Field of Classification Search
CPC .. F24F 11/30; F24F 11/74; F24F 11/77; F24F 12/001; F24F 12/006; F24F 2110/10;
(Continued)

(56) References Cited

U.S. PATENT DOCUMENTS

| | | | |
|---|---|---|---|
| 9,797,620 B2* | 10/2017 | Matsugi | F24F 11/74 |
| 2013/0118188 A1* | 5/2013 | McKie | F24F 11/30 |
| | | | 62/81 |
| 2014/0202477 A1 | 7/2014 | Qi et al. | |

FOREIGN PATENT DOCUMENTS

| | | |
|---|---|---|
| CN | 203446536 U | 2/2014 |
| CN | 203943074 U | 11/2014 |

(Continued)

OTHER PUBLICATIONS

International Search Report (PCT/ISA/210) dated Jan. 13, 2015, by the Japanese Patent Office as the International Searching Authority for International Application No. PCT/JP2014/077261.

(Continued)

*Primary Examiner* — Marc Norman
(74) *Attorney, Agent, or Firm* — Buchanan Ingersoll & Rooney PC (57) ABSTRACT

A heat-exchange ventilation device includes: a heater connection terminal to which an external connection heater is connected; a temperature sensor that measures a temperature of a supply air flow passing through an air supply passage; and a control unit that controls operations of an air supply fan and an air exhaust fan and turning-on and turning-off of the external connection heater based on a measurement result of the temperature sensor. The external connection heater is installed in an outdoor air-supply duct and heats a supply air flow flowing through the air supply passage into a heat exchanger. The air supply fan is operable at a plurality of intensities, and the control unit prohibits a state in which the air supply fan is operated at an intensity lower than an intensity set in advance and the external connection heater is turned on.

9 Claims, 3 Drawing Sheets (51) Int. Cl.
    *F24F 11/00*      (2018.01)
    *F24F 11/77*      (2018.01)
    *F25B 49/02*      (2006.01)
    *F24F 110/10*     (2018.01)
(52) U.S. Cl.
    CPC ............ *F24F 11/77* (2018.01); *F24F 12/006* (2013.01); *F24F 2110/10* (2018.01); *F25B 49/02* (2013.01); *F25B 2313/0294* (2013.01); *F25B 2600/111* (2013.01)
(58) Field of Classification Search
    CPC ... F24F 12/12; F25B 49/02; F25B 2313/0294; F25B 2600/111
    See application file for complete search history.

(56)           References Cited

FOREIGN PATENT DOCUMENTS

| JP | 6-323593 A    | 11/1994 |
| JP | 7-190449 A    | 7/1995  |
| JP | 2004-340467 A | 12/2004 |
| JP | 2005-265270 A | 9/2005  |
| JP | 2007-322078 A | 12/2007 |
| JP | 2014-95532 A  | 5/2014  |

OTHER PUBLICATIONS

Written Opinion (PCT/ISA/237) dated Jan. 13, 2015, by the Japanese Patent Office as the International Searching Authority for International Application No. PCT/JP2014/077261.

Searth Report dated Feb. 16, 2018, issued by the Russian Patent Office in the corresponding Russian Patent Application No. 2017115766/12(027283) and English translation of the Search Report. (5 pages).

\* cited by examiner

HEAT-EXCHANGE VENTILATION DEVICE

FIELD

The present invention relates to a heat-exchange ventilation device including a heater that heats external air introduced from outdoor into a heat exchanger.

BACKGROUND

When external air is introduced to indoor as it is in a cold region, there are problems such as dew condensation and cold draft causing a cold air feeling. Therefore, when the temperature of external air falls below a heater-on threshold temperature, the external air is supplied to indoor after being heated by a heater in some cases.

In a product that has a heater built therein and is capable of adjusting a temperature under control or a PTC (positive temperature coefficient) heater, heating with the heater and ventilation can be continuously performed. For a heater, there is generally used a method for controlling the heater only by turning on or off energization to the heater to simplify the control and suppress the cost and the size.

Patent Literature 1 discloses a ventilation device including an external heater. Patent Literature 2 discloses a ventilation device having a heater built therein.

CITATION LIST

Patent Literatures

Patent Literature 1: Japanese Patent Publication No. 4391125

Patent Literature 2: Japanese Patent Application Laid-open No. 2005-265270

When an external heater is used, a heater with a capacity corresponding to an air volume needs to be selected. However, in the method for controlling a heater only by turning on or off the energization to the heater, if a ventilation device is operated at a minimum air volume in a state where a heater with a capacity selected according to a maximum air volume is installed, the temperature of the heater may excessively increase, so that a safety device operates to detect an abnormality. Further, frequent repetition of turning-on and turning-off of the heater may affect the life of contact components such as a relay.

A ventilation device having a heater built therein also has a risk same as that of a case where the capacity of a heater is designed according to the maximum air volume when the heater does not have a temperature adjustment function.

Furthermore, when the air volume is small with respect to the capacity of the heater, the temperature of air having passed through the heater is increased more than necessary, and this result in a waste of power.

A specific example of such waste of power will be described below. When a ventilation device having a maximum air volume of 1000 m$^3$/h is designed in such a manner that a heater is turned on to cause the temperature of air having passed through the heater to be 0° C. when the temperature of external air is equal to or lower than −7° C., a heater with a capacity of about 2.4 kW needs to be used. Assuming that the ventilation device can change the air volume at four levels and can operate at 75%, 50%, and 25% of a rated air volume, in other words, the ventilation device can operate at air volumes of 750 m$^3$/h, 500 m$^3$/h, and 250 m$^3$/h, the temperature of air having passed through a heater with the same capacity of 2.4 kW becomes 2.3° C. at the air volume of 750 m$^3$/h, 7° C. at the air volume of 500 m$^3$/h, and 21° C. at the air volume of 250 m$^3$/h.

When the ventilation device is a heat-exchange ventilation device that performs heat exchange between a supply air flow and an exhaust air flow via a heat exchanger, heat recovery becomes meaningless if the temperature of external air introduced from outdoor into the heat exchanger increases to 21° C.

It is also conceivable to turn off the heater when the temperature of air having passed through the heater becomes equal to or higher than a heater-off threshold temperature. However, when the heater-off threshold temperature is set to a value around 10° C. to 15° C., chattering in which turning-on and turning-off of the heater is repeated frequently is likely to occur. If chattering occurs, the life of a switchgear for switching the heater between on and off is affected and wasteful heating is performed.

The inventions described in Patent Literatures 1 and 2 do not disclose any method for solving a problem that, when the ventilation device is operated at a smaller air volume than an air volume set as a standard at the time of selection or design of the heater, the temperature of external air introduced from outdoor into a heat exchanger excessively increases, which increases the possibility of frequent turning-on and turning-off of the heater.

The present invention has been achieved in view of the above problems, and an object of the present invention is to provide a heat-exchange ventilation device that can prevent an excessive increase in the temperature of external air introduced from outdoor into a heat exchanger when the ventilation device is operated at a smaller air volume than an air volume set as a standard at the time of selection or design of a heater, and can suppress frequent turning-on and turning-off of the heater.

Solution to Problem

To solve the above described problem and achieve the object a heat-exchange ventilation device according to the present invention includes: an air supply passage to guide external air from outdoor to indoor; an air exhaust passage to guide air from indoor to outdoor; an air supply fan to generate a supply air flow from outdoor toward indoor in the air supply passage; an air exhaust fan to generate an exhaust air flow from indoor toward outdoor in the air exhaust passage; a heat exchanger provided in a middle of the air supply passage and the air exhaust passage to perform heat exchange between the supply air flow and the exhaust air flow; a heater connection terminal to be connected with a heater that is installed in an outdoor air-supply duct connected on an outdoor side of the air supply passage and that heats the supply air flow flowing through the air supply passage into the heat exchanger; a temperature sensor to measure a temperature of the supply air flow passing through the air supply passage; and a control unit to control operations of the air supply fan and the air exhaust fan and turning-on and turning-off of the heater based on a measurement result of the temperature sensor. The air supply fan is operable at one of a plurality of intensities at which different air volumes of the supply air flow are generated, and the control unit prohibits a state in which the air supply fan is operated at an intensity lower than an intensity set in advance and the heater is turned on.

Advantageous Effects of Invention

According to the heat-exchange ventilation device of the present invention, it is possible to prevent an excessive increase in the temperature of external air introduced from outdoor into a heat exchanger when the ventilation device is operated at a smaller air volume than an air volume set as a standard at the time of selection or design of a heater, and to suppress frequent turning-on and turning-off of the heater.

DESCRIPTION OF EMBODIMENTS

Exemplary embodiments of a heat-exchange ventilation device according to the present invention will be explained below with reference to the accompanying drawings. The present invention is not limited to the embodiments.

First Embodiment

Figure 1:
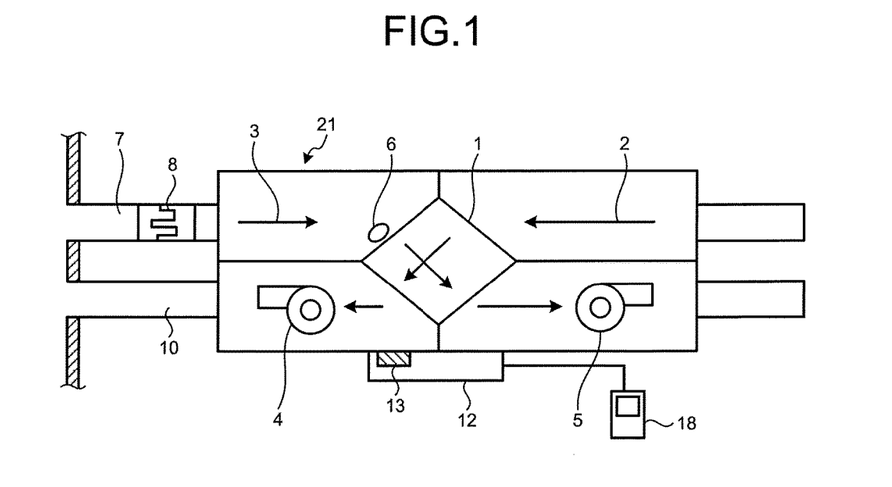
FIG. 1 is a diagram illustrating a configuration of a heat-exchange ventilation device according to a first embodiment of the present invention.

FIG. 1 is a diagram illustrating a configuration of a heat-exchange ventilation device according to a first embodiment of the present invention. A heat-exchange ventilation device 21 includes: an air supply passage 3 for guiding external air from outdoor to indoor; an air exhaust passage 2 for guiding indoor air to outdoor; an air supply fan 5 that is provided in the air supply passage 3 and generates a supply air flow from outdoor toward indoor; an air exhaust fan 4 that is provided in the air exhaust passage 2 and generates an exhaust air flow from indoor toward outdoor; a heat exchanger 1 that is provided in the middle of the air supply passage 3 and the air exhaust passage 2 and performs heat exchange between the supply air flow passing through the air supply passage 3 and the exhaust air flow passing through the air exhaust passage 2; and a control device 12 that controls operations of the air supply fan 5 and the air exhaust fan 4. A remote controller 18 for executing control of operations of the heat-exchange ventilation device 21 and various settings thereof is connected to the control device 12.

The air supply fan 5 is operable at any one of intensities at which different air volumes of the supply air flow are generated.

An outdoor air-supply duct 7 that introduces external air into the heat-exchange ventilation device 21, and an outdoor air-exhaust duct 10 that exhausts indoor air from the heat-exchange ventilation device 21 to outdoor are connected to the heat-exchange ventilation device 21. An external connection heater 8 is disposed in the outdoor air-supply duct 7 that introduces external air into the heat-exchange ventilation device 21. The external connection heater 8 is a heater that is installed in the outdoor air-supply duct 7 connected on an outdoor side of the air supply passage 3 to heat a supply air flow flowing through the air supply passage 3 into the heat exchanger 1.

The heat-exchange ventilation device 21 includes a temperature sensor 6 that measures the temperature of external air introduced into the air supply passage 3 through the outdoor air-supply duct 7. The heat-exchange ventilation device 21 executes control to supply power to the external connection heater 8 when the temperature of external air measured by the temperature sensor 6 becomes equal to or lower than a heater-on threshold temperature.

Figure 2:
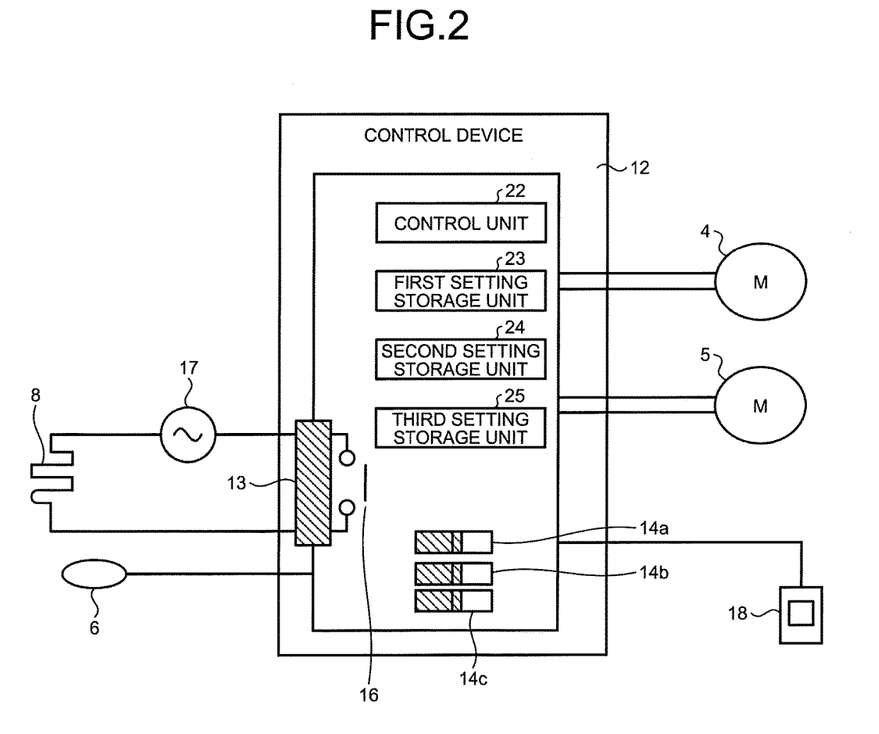
FIG. 2 is a diagram illustrating a configuration of a control device in the heat-exchange ventilation device according to the first embodiment.

FIG. 2 is a diagram illustrating a configuration of the control device in the heat-exchange ventilation device according to the first embodiment. The control device 12 includes a heater connection terminal 13 to which the external connection heater 8 is connected, and a heater switchgear 16 that closes when the temperature of external air falls below a heater-on threshold temperature set in advance and opens when a release condition is met.

The heat-exchange ventilation device 21 can change various settings with a first switch 14a, a second switch 14b, and a third switch 14c for changing settings provided on the control device 12, or with the remote controller 18. Because various settings can be made with the first switch 14a, the second switch 14b, and the third switch 14c provided on the control device 12, the heat-exchange ventilation device 21 can have a configuration from which the remote controller 18 is omitted.

The control device 12 includes: a control unit 22 that controls operations of the air supply fan 5 and the air exhaust fan 4 and turning-on and turning-off of the external connection heater 8 based on a measurement result of the temperature sensor 6; a first setting storage unit 23 that stores therein contents of settings by the first switch 14a; a second setting storage unit 24 that stores therein contents of settings by the second switch 14b; and a third setting storage unit 25 that stores therein contents of settings by the third switch 14c.

The first switch 14a is a switch for setting whether the external connection heater 8 is connected. The second switch 14b is a switch for setting a heater-on threshold temperature at which the heater switchgear 16 is closed to start power supply to the external connection heater 8. The third switch 14c is a switch for setting one of an air-volume prioritized mode, a heater prioritized mode, and a hybrid mode in which the external connection heater 8 is to be controlled.

The air-volume prioritized mode is a mode in which the external connection heater 8 is prohibited from being turned on when the air supply fan 5 is operated at a lower intensity than an intensity set in advance. In the following descriptions, the intensity set in advance is assumed to be an intensity that enables to generate a supply air flow of an air volume one level higher than a minimum air volume. That is, the air-volume prioritized mode is a mode in which the external connection heater 8 is turned off when the air supply fan 5 is operated at a lower intensity than that set in advance and the external connection heater 8 is turned on when the air supply fan 5 is operated at an intensity equal to or higher than that set in advance. The heater prioritized mode is a mode in which the intensity of the operation of the air supply fan 5 is changed to increase the air volume of the supply air flow generated by the air supply fan 5 before the external connection heater 8 is turned on when the external connection heater 8 is to be turned on in a case where the air supply fan 5 is operated at a lower intensity than that set in advance; and the external connection heater 8 is turned on without changing the intensity of the operation of the air supply fan 5 when the external connection heater 8 is to be turned on in a case where the air supply fan 5 is operated at an intensity equal to or higher than that set in advance. The hybrid mode is a mode in which: identical control to that in the heater prioritized mode is executed when a measurement result of the temperature sensor 6 is equal to or lower than an operable lower limit temperature set in advance; and identical control to that in the air-volume prioritized mode is executed when a measurement result of the temperature sensor 6 is above the operable lower limit temperatures set in advance. That is, in the hybrid mode, the external connection heater 8 is prohibited from being turned on during an operation at a minimum air volume, and the operation at the minimum air volume is prohibited and the external connection heater 8 is turned on when the temperature of external air introduced from outdoor into the heat exchanger 1 becomes equal to or lower than the operable lower limit temperature of the heat-exchange ventilation device 21. The operable lower limit temperature of the heat-exchange ventilation device 21 is a temperature set based on whether a drain recovery function is furnished and depending on a dew condensation resistance.

In a case where the setting contents stored in the first setting storage unit 23 are to use the external connection heater 8, the heater switchgear 16 connected to the external connection heater 8 is closed and a voltage is applied to the external connection heater 8 by a heater power supply 17 when the temperature of external air falls below the heater-on threshold temperature stored in the second setting storage unit 24.

When the setting contents stored in the third setting storage unit 25 are the heater prioritized mode, the operation at the minimum air volume is prohibited after the temperature of external air has fallen below the heater-on threshold temperature stored in the second setting storage unit 24 and the external connection heater 8 has been turned on. When the temperature of external air falls below the heater-on threshold temperature during the operation at the minimum air volume, the heater switchgear 16 is closed and the air volume of the supply air flow generated by the air supply fan 5 is increased by one level.

Meanwhile, when the setting contents stored in the third setting storage unit 25 are the air-volume prioritized mode, the external connection heater 8 is not turned on during the operation at the minimum air volume even when the temperature of external air falls below the heater-on threshold temperature stored in the second setting storage unit 24. This control is effective when the heat-exchange ventilation device 21 is configured to be capable of changing the air volume associated with an external device such as a $CO_2$ sensor. The operation of the external connection heater 8 is prohibited at the time of the operation at the minimum air volume because it is highly likely that energy is consumed wastefully if the external connection heater 8 is turned on during the operation at the minimum air volume.

When the setting contents stored in the third setting storage unit 25 are the hybrid mode: the external connection heater 8 is turned off during the operation at the minimum air volume when a measurement result of the temperature sensor 6 is above the operable lower limit temperature of the heat-exchange ventilation device 21; and the operation at the minimum air volume is prohibited and the external connection heater 8 is turned on when a measurement result of the temperature sensor 6 is equal to or lower than the operable lower limit temperature of the heat-exchange ventilation device 21. In the hybrid mode, the heat-exchange ventilation device 21 can be operated to perform ventilation even when the external air is in a low temperature state.

Figure 3:
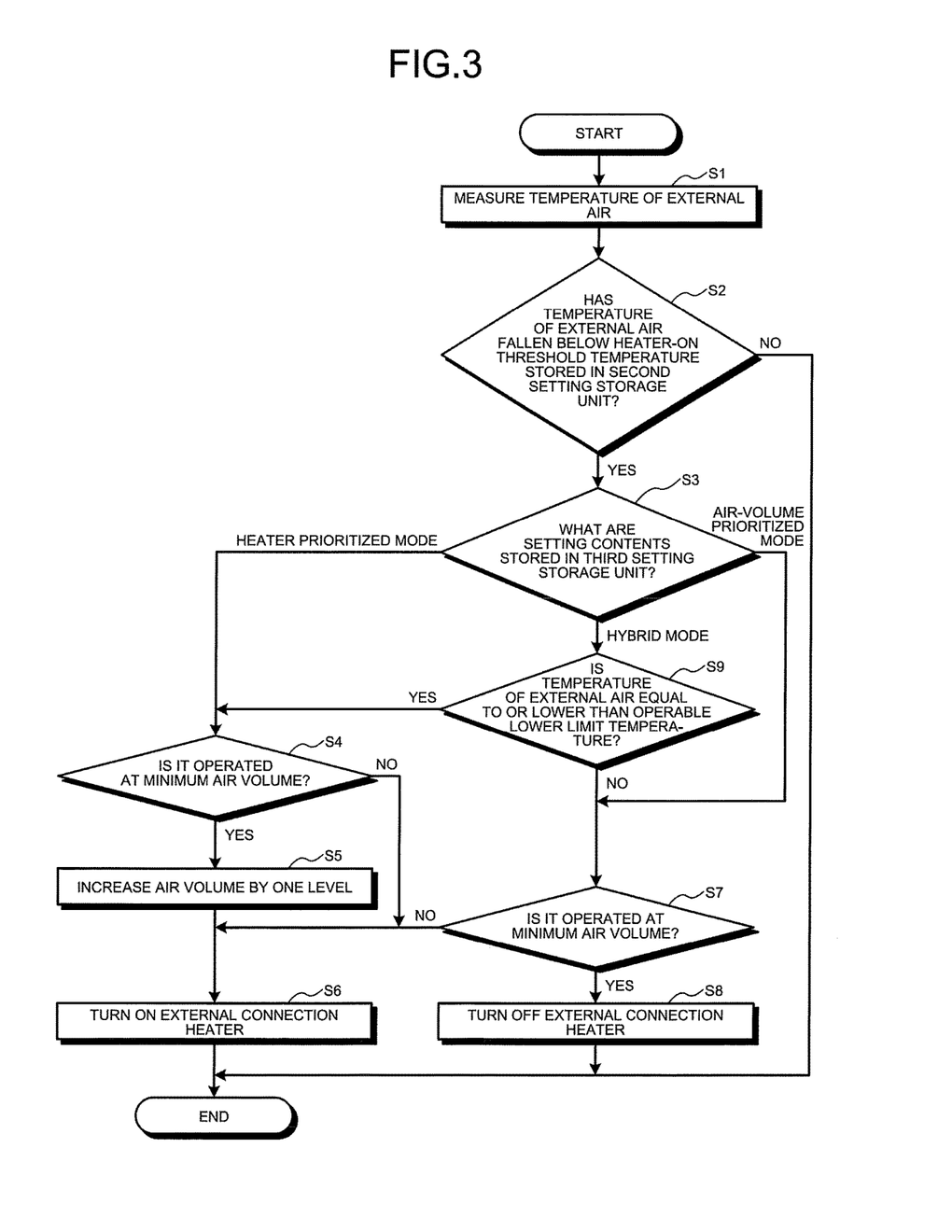
FIG. 3 is a flowchart illustrating a flow of an operation performed by the heat-exchange ventilation device according to the first embodiment when setting contents stored in a first setting storage unit are settings to use an external connection heater.

FIG. 3 is a flowchart illustrating a flow of an operation performed by the heat-exchange ventilation device according to the embodiment when the setting contents stored in the first setting storage unit are to use the external connection heater. At Step S1, the control unit 22 measures the temperature of external air introduced through the air supply passage 3 into the heat exchanger 1 using the temperature sensor 6. At Step S2, the control unit 22 determines whether the temperature of external air has fallen below the heater-on threshold temperature stored in the second setting storage unit 24. When the temperature of external air has fallen below the heater-on threshold temperature stored in the second setting storage unit 24 (YES at Step S2), the control unit 22 checks the setting contents stored in the third setting storage unit 25 at Step S3. When the temperature of external air is not below the heater-on threshold temperature stored in the second setting storage unit 24 (NO at Step S2), the control unit 22 ends the process.

When the setting contents stored in the third setting storage unit 25 are the heater prioritized mode (heater prioritized mode at Step S3), the control unit 22 checks whether the air supply fan 5 is operated at the minimum air volume at Step S4. When the air supply fan 5 is operated at the minimum air volume (YES at Step S4), the control unit 22 increases the air volume of the supply air flow generated by the air supply fan 5 by one level at Step S5. When the air supply fan 5 is not operated at the minimum air volume (NO at Step S4), the process proceeds to Step S6. At Step S6, the control unit 22 closes the heater switchgear 16 to turn on the external connection heater 8. When the external connection heater 8 is already on at Step S6, that state is maintained. After Step S6, the control unit 22 ends the process.

When the setting contents stored in the third setting storage unit 25 are the air-volume prioritized mode (air-volume prioritized mode at Step S3), the control unit 22 checks whether the air supply fan 5 is operated at the minimum air volume at Step S7. When the air supply fan 5 is operated at the minimum air volume (YES at Step S7), the control unit 22 opens the heater switchgear 16 to turn off the external connection heater 8 at Step S8. When the external connection heater 8 is already off at Step S8, that state is maintained. After Step S8, the control unit 22 ends the process. When the heat-exchange ventilation device 21 is not operated at the minimum air volume (NO at Step S7), the control unit 22 closes the heater switchgear 16 to turn on the external connection heater 8 at Step S6. After Step S6, the control unit 22 ends the process.

When the setting contents stored in the third setting storage unit 25 are the hybrid mode (hybrid mode at Step S3), the control unit 22 checks whether the temperature of external air is equal to or lower than the operable lower limit temperature at Step S9. When the temperature of external air is equal to or lower than the operable lower limit temperature (YES at Step S9), the process proceeds to Step S4. When the temperature of external air is not equal to or lower than the operable lower limit temperature (NO at Step S9), the process proceeds to Step S7. The process at Step S4 and the process at Step S7 are as described above.

After ending the process, the control unit 22 performs again the processes from Step S1 to Step S9 at the next detection timing.

As described above, in the heat-exchange ventilation device 21 according to the first embodiment, the control unit 22 links switching of the external connection heater 8, which heats a supply air flow passing through the air supply passage 3 between on and off, with switching of the air volume of the air supply fan 5, while prohibiting a state in which the air supply fan 5 is operated at a lower intensity than that set in advance and the external connection heater 8 is turned on, thereby adjusting the temperature of the supply air flow passing through the air supply passage 3. Therefore, also in simple heater control that does not include heat-generation amount control on the external connection heater 8, the heat-exchange ventilation device 21 can prevent overheat of the external connection heater 8 with respect to a change in the volume of air to be heated. Furthermore, the heat-exchange ventilation device 21 according to the first embodiment can prevent external air introduced from outdoor into the heat exchanger 1 from being heated more than necessary and can suppress wasteful power consumption.

In the air-volume prioritized mode in which the external connection heater 8 is prohibited from being turned on at the time of a minimum air volume, there is a concern of cold draft in which the temperature of supplied air becomes low when the device is operated at the time of a low external air temperature with the external connection heater 8 turned off. However, heat exchange efficiency generally increases when the device is operated at a minimum air volume. Accordingly, there is not a great difference between the temperature of supply air in a case where the external connection heater 8 is turned on during the operation at the maximum air volume and the temperature of supply air in a case where the external connection heater 8 is turned off during the operation at the minimum air volume. Furthermore, because the air speed of an air flow flowing out of an air outlet also becomes low during the operation at the minimum air volume, a reachable distance of cold air is shortened and the possibility of cold draft is reduced.

Furthermore, in the hybrid mode, the heat-exchange ventilation device 21 according to the first embodiment can continue ventilation even in a situation where the temperature of external air becomes equal to or lower than the operable lower limit temperature of the heat-exchange ventilation device 21.

In the above descriptions, the intensity set in advance is an intensity that enables to generate a supply air flow of an air volume one level higher than the minimum air volume. However, the intensity set in advance can be also an intensity that enables to generate a supply air flow of an air volume two or more levels higher than the minimum air volume.

Second Embodiment

Figure 4:
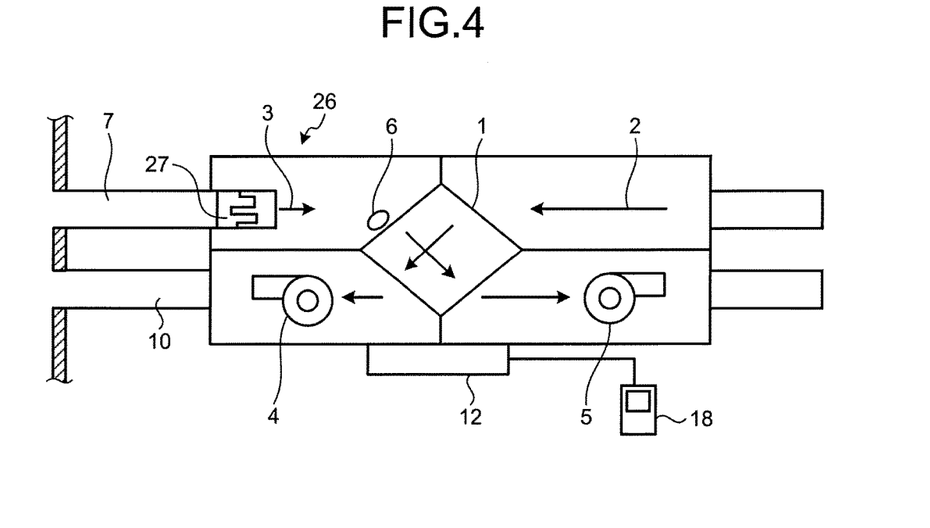
FIG. 4 is a diagram illustrating a configuration of a heat-exchange ventilation device according to a second embodiment of the present invention.

FIG. 4 is a diagram illustrating a configuration of a heat-exchange ventilation device according to a second embodiment of the present invention. A heat-exchange ventilation device 26 according to the second embodiment is different from the heat-exchange ventilation device 21 according to the first embodiment illustrated in FIG. 1 in that the heater connection terminal 13 is not included and that a built-in heater 27 is installed instead of the external connection heater 8 in the air supply passage 3. The built-in heater 27 is a heater that heats a supply air flow flowing through the air supply passage 3 into the heat exchanger 1.

In the heat-exchange ventilation device 26 according to the second embodiment, information indicating whether to use a heater is stored in the first setting storage unit instead of the information indicating whether a heater is connected. Operations of the heat-exchange ventilation device 26 are identical to the operations of the heat-exchange ventilation device 21 according to the first embodiment illustrated in FIG. 3.

The heat-exchange ventilation device 26 according to the second embodiment can prevent overheat of the built-in heater 27 with respect to a change in the volume of air to be heated also in simple heater control not including heat-generation amount control on the built-in heater 27. Furthermore, the heat-exchange ventilation device 26 according to the second embodiment can prevent external air from being heated more than necessary to suppress wasteful power consumption.

The configurations described in the above embodiments are only examples of the contents of the present invention. These configurations can be combined with other well-known techniques, and can be configured while modifying it without departing from the scope of the present invention, such as omitting a part these configurations.

REFERENCE SIGNS LIST 1 heat exchanger
2 air exhaust passage
3 air supply passage
4 air exhaust fan
5 air supply fan
6 temperature sensor
7 outdoor air-supply duct
8 external connection heater
10 outdoor air-exhaust duct
12 control device
13 heater connection terminal
14a first switch
14b second switch
14c third switch
16 heater switchgear
17 heater power supply
18 remote controller
21, 26 heat-exchange ventilation device
22 control unit
23 first setting storage unit
24 second setting storage unit
25 third setting storage unit
27 built-in heater

The invention claimed is:

1. A heat-exchange ventilation device comprising:
an air supply passage to guide external air from outdoor to indoor;
an air exhaust passage to guide air from indoor to outdoor;
an air supply fan to generate a supply air flow from outdoor toward indoor in the air supply passage;
an air exhaust fan to generate an exhaust air flow from indoor toward outdoor in the air exhaust passage;
a heat exchanger provided in a middle of the air supply passage and the air exhaust passage to perform heat exchange between the supply air flow and the exhaust air flow;
a heater connection terminal to be connected with a heater that is installed in an outdoor air-supply duct connected on an outdoor side of the air supply passage and that heats the supply air flow flowing through the air supply passage into the heat exchanger;
a temperature sensor to measure a temperature of the supply air flow passing through the air supply passage; and
a controller to control operations of the air supply fan and the air exhaust fan and turning-on and turning-off of the heater based on a measurement result of the temperature sensor, wherein
the air supply fan is operable at one of a plurality of intensities at which different air volumes of the supply air flow are generated, and the controller prohibits a state in which the air supply fan is operated at an intensity lower than an intensity set in advance and the heater is turned on.

2. The heat-exchange ventilation device according to claim 1, wherein
the controller has a plurality of modes for adjusting a temperature of a supply air flow passing through the air supply passage, and
one of the modes is an air-volume prioritized mode in which the heater is turned off when the air supply fan is operated at an intensity lower than an intensity set in advance, and the heater is turned on when the air supply fan is operated at an intensity equal to or higher than the intensity set in advance.

3. The heat-exchange ventilation device according to claim 1, wherein
the controller has a plurality of modes for adjusting a temperature of a supply air flow passing through the air supply passage, and
one of the modes is a heater prioritized mode in which an intensity of an operation of the air supply fan is changed to increase an air volume of the supply air flow generated by the air supply fan when the heater is to be turned on in a case where the air supply fan is operated at an intensity lower than an intensity set in advance, and the heater is turned on without changing an intensity of an operation of the air supply fan when the heater is to be turned on in a case where the air supply fan is operated at an intensity equal to or higher than the intensity set in advance.

4. The heat-exchange ventilation device according to claim 1, wherein
the controller has a plurality of modes for adjusting a temperature of a supply air flow passing through the air supply passage,
one of the modes is an air-volume prioritized mode in which the heater is turned off when the air supply fan is operated at an intensity lower than an intensity set in advance, and the heater is turned on when the air supply fan is operated at an intensity equal to or higher than the intensity set in advance, and
another of the modes is a heater prioritized mode in which an intensity of an operation of the air supply fan is changed to increase an air volume of the supply air flow generated by the air supply fan when the heater is to be turned on in a case where the air supply fan is operated at an intensity lower than an intensity set in advance, and the heater is turned on without changing an intensity of an operation of the air supply fan when the heater is to be turned on in a case where the air supply fan is operated at an intensity equal to or higher than the intensity set in advance.

5. The heat-exchange ventilation device according to claim 4, wherein one of the modes is a hybrid mode in which control in the heater prioritized mode is executed when a measurement result of the temperature sensor is equal to or lower than an operable lower limit temperature set in advance, and control in the air-volume prioritized mode is executed when a measurement result of the temperature sensor is above the operable lower limit temperature set in advance.

6. A heat-exchange ventilation device comprising:
an air supply passage to guide external air from outdoor to indoor;
an air exhaust passage to guide air from indoor to outdoor;
an air supply fan to generate a supply air flow from outdoor toward indoor in the air supply passage;
an air exhaust fan to generate an exhaust air flow from indoor toward outdoor in the air exhaust passage;
a heat exchanger provided in a middle of the air supply passage and the air exhaust passage to perform heat exchange between the supply air flow and the exhaust air flow;
a heater to heat the supply air flow flowing through the air supply passage into the heat exchanger;
a temperature sensor to measure a temperature of the supply air flow passing through the air supply passage; and
a controller to control operations of the air supply fan and the air exhaust fan and turning-on and turning-off of the heater based on a measurement result of the temperature sensor, wherein
the air supply fan is operable at one of a plurality of intensities at which different air volumes of the supply air flow are generated, and
the controller prohibits a state in which the air supply fan is operated at an intensity lower than an intensity set in advance and the heater is turned on.

7. The heat-exchange ventilation device according to claim 6, wherein
the controller has a plurality of modes for adjusting a temperature of a supply air flow passing through the air supply passage, and
one of the modes is an air-volume prioritized mode in which the heater is turned off when the air supply fan is operated at an intensity lower than an intensity set in advance, and the heater is turned on when the air supply fan is operated at an intensity equal to or higher than the intensity set in advance.

8. The heat-exchange ventilation device according to claim 6, wherein
the controller has a plurality of modes for adjusting a temperature of a supply air flow passing through the air supply passage, and
one of the modes is a heater prioritized mode in which an intensity of an operation of the air supply fan is changed to increase an air volume of the supply air flow generated by the air supply fan when the heater is to be turned on in a case where the air supply fan is operated at an intensity lower than an intensity set in advance, and the heater is turned on without changing an intensity of an operation of the air supply fan when the heater is to be turned on in a case where the air supply fan is operated at an intensity equal to or higher than the intensity set in advance.

9. The heat-exchange ventilation device according to claim 6, wherein
the controller has a plurality of modes for adjusting a temperature of a supply air flow passing through the air supply passage,
one of the modes is an air-volume prioritized mode in which the heater is turned off when the air supply fan is operated at an intensity lower than an intensity set in advance, and the heater is turned on when the air supply fan is operated at an intensity equal to or higher than the intensity set in advance, and
another of the modes is a heater prioritized mode in which an intensity of an operation of the air supply fan is changed to increase an air volume of the supply air flow generated by the air supply fan when the heater is to be turned on in a case where the air supply fan is operated at an intensity lower than an intensity set in advance, and the heater is turned on without changing an intensity of an operation of the air supply fan when the heater is to be turned on in a case where the air supply fan is operated at an intensity equal to or higher than the intensity set in advance.

* * * * *